United States Patent [19]

Marx et al.

[11] 3,907,737

[45] Sept. 23, 1975

[54] METAL COATING COMPOSITION OF WATER INSOLUBLE BINDER AND WATER SOLUBLE THICKENER

[75] Inventors: Matthias Marx, Bad Durkheim; Gerhard Storck, Ruchheim, both of Germany

[73] Assignee: Badische Anilin- & Soda-Fabrik Aktiengesellschaft, Ludwigshafen (Rhine), Germany

[22] Filed: Mar. 2, 1973

[21] Appl. No.: 337,657

[30] Foreign Application Priority Data
Mar. 4, 1972  Germany............................ 2210483

[52] U.S. Cl................. 260/29.6 NR; 117/126 GB; 117/126 GE; 117/128.4; 161/186; 161/216; 260/17 R; 260/29.4 R; 260/29.4 UA; 260/29.6 TA; 260/29.6 RW; 260/836; 260/851; 260/859 R; 260/873
[51] Int. Cl. ........................................... C08f 45/24
[58] Field of Search... 260/29.6 NR, 29.6 RW, 29.6 R, 260/29.4 UA, 17 R

[56] References Cited
UNITED STATES PATENTS

| | | | |
|---|---|---|---|
| 2,784,128 | 3/1957 | Schroeder................... | 260/29.6 NR |
| 3,175,987 | 3/1965 | Pretka......................... | 260/29.6 NR |
| 3,271,342 | 9/1966 | Kuhn et al................... | 260/29.6 NR |
| 3,321,432 | 5/1967 | Strasser et al............... | 260/29.6 NR |
| 3,427,192 | 2/1969 | Bolinger...................... | 260/29.6 NR |
| 3,491,051 | 1/1970 | Elkin et al................... | 260/29.6 NR |
| 3,582,507 | 6/1971 | Peerman..................... | 260/29.6 NR |
| 3,652,326 | 3/1972 | Ward........................... | 260/29.6 NR |
| 3,684,758 | 8/1972 | Honig et al.................. | 260/29.6 NR |

*Primary Examiner*—Harold D. Anderson
*Attorney, Agent, or Firm*—Johnston, Keil, Thompson & Shurtleff

[57] ABSTRACT

Coating, impregnating and bonding agents consisting of suspensions in aqueous solutions of organic polymeric materials of finely divided binders which are insoluble or at the most only slightly swellable in water, which are curable by heat, which are based on polymerizates, polycondensates or polyadducts and which may contain further substances. The suspensions are particularly suitable for coating and impregnation.

14 Claims, No Drawings

METAL COATING COMPOSITION OF WATER INSOLUBLE BINDER AND WATER SOLUBLE THICKENER

The present invention relates to coating, impregnating and bonding agents which contain a binder which is insoluble or at the most slightly swellable in water and which is finely divided form in an aqueous solution containing a water-soluble thickening agent.

It is known that aqueous polymer dispersions can be prepared by the process of emulsion polymerization from monomeric polymerizable compounds (dispersed in water by means of a surfactant (emulsifier) in the presence of a free-radical-generating polymerization initiator. It is a disadvantage of these dispersions however that the waterproofness of films obtained therefrom is poor because of the emulsifier content. Another disadvantage of emulsion polymers is that a number of essential additives such as pigments, fillers, cure catalysts, promoters, extenders, reinforcement materials and flow improvers can only be subsequently incorporated into the polymer dispersions and therefore a completely homogeneous dispersion of these substances in the polymer particles cannot be achieved.

To reduce environmental pollution and the risk of fire in handling coating, impregnating and adhesive formulations there has been growing interest recently in powder systems as well as water-dilutable systems. Very high expenditire is necessary however for the production, storage and application of powder systems.

Water-dilutable coating materials have hitherto only been used on a large scale in the field of electrocoating. Expensive stationary equipment is necessary to carry this out.

In the conventional methods of applying water-dilutable coating materials there are peculiar probelms which as a rule are attributable to an anomaly in the viscosity-dilution behavior of such systems in the industrially important concentration range from about 30 to 40 percent by weight and make it difficult to set up a particular processing viscosity or produce full-bodied colors having useful application properties.

Aqueous polymer dispersions are usually unsuitable for example for the production of heat-durable coatings unless hardness, gloss and chemical resistance are not of great importance.

It is an object of the present invention to provide aqueous coating, impregnating and bonding agents which do not exhibit the disadvantages of aqueous polymer dispersions described above, which do not require the high expenditure for apparatus necessary for electorcoating and powder coating and which may be processed particularly advantageously.

In accordance with the present invention a coating, impregnating or bonding agent contains:
  A. water;
  B. at least one heat-curable binder which is based on a polymerizate, polycondensate and/or polyadduct and which is insoluble or at the most slightly swellable in water;
  C. at least one thickening agent dissolved in water; and optionally
  D. one or more water-soluble binders and/or dispersing agents which are compatible with (B);

component (B) being in the form of particles having a particle diameter of from 0.1 to 150, preferably from 5 to 90, microns, the said particles if desired containing additives such as pigments, fillers, dyes, crosslinking catalysts, promoters, flow improvers and/or solvents, and the component (C) being an organic polymeric material.

Coating, impregnating and bonding agents are preferred whose heat-curable binder (B) has a melt viscosity of from 500 to 10,000 poises at 125°C and whose component (C) has a viscosity of from 0.5 to 50 centipoises in 0.015 percent aqueous solution at 20°C and is the salt of a polyacrylic acid.

The dispersions of the invention have the advantage over prior art aqueous dispersions that they may contain mass-pigmented particles, that much less water-soluble or water-sensitive additives are necessary, and that very hard and high gloss molding materials and impregnations may be obtained.

They are suitable for the production of coatings on a great variety of substrates, particularly on metal surfaces, as for example aliminum, sheet iron and phosphated sheet iron.

The dispersions of the invention show a higher solids content and lower application viscosity than aqueous polymer solutions and coating materials.

They have the advantage over powdered materials that their applications is not restricted to any specific installations. Dispersions according to the invention, unlike powders, can be applied with conventional sprayguns (such as conventionally used for liquid coating materials) and also by dipping, brushing and the like. Shading with pigments or soluble dyes is much simpler than in the case of powders where the softening temperature has to be above about 85° to 90°C because of the risk of blocking or agglomeration in the storage. This limitation does not apply in the case of the aqueous dispersions of the invention. Another advantage over powdered materials is that the dispersions of the invention can be prepared direct by precipitation of the binder from the organically dissolved formulation in water. Since there is no need for drying or other treatment the process is simpler than the production of powders.

The following details may be given regarding the components which make up the coating, impregnating and bonding agents:

a. The proportion of water in the coating, impregnating or bonding agents of the invention may be varied within wide limits. It is generally from 40 to 70 percent and preferably from 415 to 60 percent, by weight. Component (A) may if desired contain minor amounts of up to 5 percent by weight of volatile organic solvents which are miscible with water, as for example lower alcohols such as methanol, ethanol, propanols, and butanols, ketones such as acetone and butanone, or esters such as ethyl acetate.

B. Heat-curable binders which are based on a polymer, polycondensate or polyadduct and which are insoluble or at most slightly swellable in water are suitable as component (B) which is present in the aqueous phase in finely divided form.

Those binders are preferred which melt at a temperature of from 60° to 150°C, which at 125°C have a melt viscosity of from 500 to 10,000 poises, preferably from 2000 to 10,000 poises, and at a temperature of 125°C do not, until after at least three minutes, exceed the viscosity limit of 10,000 poises brought about by the crosslinking reaction. The only restriction placed on the chemical composition is that the binder must be thermally stable. At the processing temperatures of not more than 200°C maintained during the processing time of from about five minutes to about one hour they should not undergo any undesirable degradation reactions which result in any substantial impairment of the appearance, the shelf life (for example resistance to attack by chemicals or weathering) or mechanical strength.

Suitable binders are based on polymerization, polyaddition or polycondensation products which contain functional groups such as hydroxyl, carboxyl, epoxide, amide, amino, isocyanate, active methylene, anhydride, substituted amide, methylol, methylol ether or olefinically unsaturated groups. The binders are autocrosslinking or crosslink on addition of a curing agent.

The heat-curable binders may contain up to 50 percent by weight of thermoplastics. The K value (according to Fikentscher, Cellulose-chemie, 13, 58 (1932)) of the crosslinkable and thermoplastic binder should not be more than 33 and is preferably within the range from 15 to 25.

Examples of suitable binders based on polymerizates are copolymers which contain units of olefinically unsaturated hydrocarbons such as ethylene, propylene, isobutylene and/or aldenylaromatics such as styrene, vinyltoluene, α-methylstyrene, isopropenylbenzene and nuclear halogenated analogs of the same and/or esters of acrylic acid and/or methacrylic acid with $C_{1-12}$ alcohols such as methyl, ethyl, propyl, n-butyl, isobutyl, tert.-butyl, cyclohexyl, hexyl, 2-ethylhexyl or dodecyl acrylate, methyl methacrylate, butyl methacrylate and/or vinyl esters of $C_{2-11}$ linear and/or branched carboxylic acids such as vinyl acetate, vinyl propionate, vinyl pivalate, vinyl 2-ethylhexylate and/or vinyl halides such as vinyl chloride and/or vinyl ethers of $C_{1-5}$ alcohols and/or diesters of copolymerizable olefinically unsaturated $C_{3-5}$ dicarboxylic acids with $C_{1-12}$ monoalkanols such as dibutyl maleate, dinonyl maleate or dilauryl maleate, monomers containing nitrile groups such as acrylonitrile or methacrylonitrile or copolymerizable olefinically unsaturated compounds containing functional groups which are important for hardening, such as monomers containing hydroxyl groups such as monoesters of acrylic or methacrylic acid with $C_{2-8}$ polyhydric alcohols or oxaalcohols such as ethylene glycol monoacrylate, propylene glycol monoacrylate, butanediol monoacrylate, diethylene glycol monoacrylate, triethylene glycol monoacrylate, dipropylene glycol monoacrylate and the corresponding monomethacrylates, S-vinylthioethanol and/or monomers containing carboxyl groups such as acrylic acid, methacrylic acid, itaconic acid, crotonic acid or monoesters of copolymerizable olefinically unsaturated $C_{3-5}$ dicarboxylic acids with $C_{1-18}$ monoalkanols such as the monobutyl, mononyl and monooctadecyl esters of maleic acid and/or monomers containing anhydride groups such as maleic anhydride or tetrahydrophthalic anhydride and/or monomers containing amido groups such as acrylamide, methacrylamide, N-alkylcrylamides, N-alkylmethacrylamides, N,N-dialkylacrylamides, diarylacrylamides, methylolated monomers containing amido groups such as N-methylolacrylamide, N-methylolmethacrylamide and/or monomers containing N-methylolamide groups etherified with $C_{1-8}$ alcohols, as for example N-butoxymethylolacrylamide and N-butoxymethylolmethacrylamide.

Examples of copolymerizable olefinically unsaturated compounds containing further functional groups of the type specified above are glycidyl acrylate, glycidyl methacrylate, dialkylaminoethyl acrylates, dialkylaminoethyl methacrylates, vinylisocyanate and acrolein.

Examples of suitable binders based on a polycondensate are epoxy resins such as are obtained for example by reaction of polyhydroxy compounds with epichlorodydrin and are described for example in D. H. Solomon, "The Chemistry of Organic Film Formers" (1967), pages 179 et seq. Epoxy resins which are solid at room temperature such as are obtained for example by reaction of epichlorohydrin with polynuclear phenols, for example bisphenol A, by a conventional method and which have epoxide values of from 0.02 to 0.4 are particularly suitable.

Other suitable polycondensates are saturated and unsaturated polyesters which are described for example in Houben-Weyl, "Methodender organischen Chemie," volume XIV/2, pages 1 to 46, as for example the reaction products of glycerol and terephthalic acid, or amino resins, as for example crosslinkable and if desired wholly or partly etherified urea-, melamine- or benzoguanamine-formaldehyde precondensates and phenolic resins, for example those described in Houben-Weyl, volume XIV/2, pages 319 et seq.

Saturated polyesters of isophthalic acid, adipic acid, neopentyl glycol and trimellitic anhydride with acid numbers in the range from 40 to 60 are also very suitable. These polyesters are conveniently used mixed with epoxy resins of the bisphenol-A type (epoxide value from about 0.5 to 0.1), the mixtures containing from about 60 to 95 percent, preferably from about 75 to 90 percent, by weight of the polyester.

Examples of suitable binders based on a polyadduct are polyurethane resins, for example mixtures of blocked polyisocyanates and polyesters of the type described for example in Houben-Weyl, volume XIV/2, pages 57 et seq. Mixtures of saturated polyesters with OH numbers of from 20 to 250 with blocked isocyanates have proved to be particularly suitable. Examples of suitable blocked isocyanates are to be found in German Patent Application P 1771374.5-45. Diisocyanates and triiscynanates which are blocked with caprolactam, for example isophorone diisocyanate blocked with caprolactam, is preferred when particularly good flow and low color number of the coating are required.

Component (B) in the coating, impregnating and bonding agents of the invention may contain other additives such as fillers, hardeners, as for example organic or inorganic acids, pigments, as for example inorganic oxides such as titanium dioxide, extenders, as for example chalk, talc, loading agents, as for example heavy spar, reinforcement materials, as for example glass fibers, compounds which develop vaporizable or volatile substances when heated, as for example substances containing blocked reactive groups, as for example blocked isocyanates, and also other auxiliaries and modifying agents, as for example flow improvers, wetting agents, as for example silicones, or optical brighteners.

The flow improvers are of particular importance in some cases. These are compounds having a low softening and melting temperature; low molecular weight synthetic rubbers or modified natural materials, particularly polyacrylic esters, polybutadienes or polyisoprenes.

Low molecular weight organic solvents such as esters, ketones and alcohols are also important as plasticizers. These solvents may be insoluble or soluble in water so that a partition equilibrium of the solvent is set up between the dispersed organic phase and the continuous aqueous phase. The presence of organic, mainly polar organic solvent in the aqueous phase in many cases impairs the effectiveness of the thickening agent. As a rule accurate correlation of the types and amounts of components in the suspension is necessary.

Hardeners to be used optionally with components (B) may be the conventional compounds which catalyze or make possible the cross-linking of the polymers with functional groups, for example diisocyanates or polyisocyanates, preferably in blocked form, amine-formaldehyde or phenol-formaldehyde condensation products for cross-linking binders based on polymers and having hydroxyl, carboxyl or amino and epoxy resins as closslinkers for compounds having amino, anhydride or carboxyl groups.

The following are examples of catalytically acting hardeners: acids or compounds which act as acids when heated and which accelerate crosslinking by esterification, transesterification or by transetherification, for example of methylol ether groups; tertiary amines for accelerating isocyanate reactions; heavy metal compounds catalyzing the curing by autoxidation or oxidation reactions; photoinitiators for accelerating or initiating reactions proceeding under the action of electromagnetic radiation; and substances forming free radicals for the acceleration of grafting reactions.

Component (B) in the dispersions of the invention is dispersed or suspended in the continuous aqueous phase (A). The particle diameter of component (B) is from 0.1 to 150 microns, preferably from 5 to 90 microns, which can be applied particularly well by conventional methods, for example by compressed air equipment. The production of particles of this size may be carried out in various ways. One possible method is precipitation of the binder from solution using high shearing forces. Another method is grinding the binder followed by fractionation by screening.

The shape of the suspended particles, i.e. whether they are spherical or angular, or have a smooth or rough surface, as a rule does not have an appreciable effect on the use and properties of coatings, impregnations or bonds prepared therewith.

Component (B) is contained in the coating, impregnating or bonding agents of the invention in an amount of from 30 to 60 percent, preferably from 40 to 55 percent, by weight.

(C) In accordance with the invention, the continuous aqueous phase (A) contains, as a thickener dissolved in water, an organic polymer (C). Preferred components (C) are thickening agents which in 0.015% aqueous solution at 20°C have a viscosity of from 0.5 to 50 centipoises. Examples of suitable organic polymers are high molecular weight water-soluble polymeric materials such as carboxymethylcelluloses, methylcelluloses, polyvinylpyrrolidone, polyacrylamide, polymethacrylamide, polymers or copolymers of ammonium acrylate, ammonium methacrylate or dimethylaminoethylammonium hydrochloride. Salts of polyacrylic acid are particularly preferred. The thickening agent serves to set up the desired viscosity and to increase the stability of the suspension in storage.

The thickening agent (C) is generally contained in the coating, impregnating or bonding agents of the invention in an amount of from 0.01 to 5 percent, preferably from 0.01 to 2 percent, by weight.

(D) It is often necessary to add a binder and/or dispersing agent (D) capable of true or colloidal solution in the aqueous phase to prevent agglomeration of the dispersed solid particles and thus to suitably adjust the viscosity and processability of the suspensions.

The binders and/or dispersing agents are polymerized electrolytes having anionic or cationic groups. These agents are generally effective upon the addition of very small amounts from about 0.01 to 0.5 percent based on the dispersed material; they may conveniently be used in an amount of from 0.1 to 5 percent based on the dispersed material.

Components (C) and (D) conveniently contain functional groups which permit a chemical reaction with the dispersed component (B) during the thermal curing process. The compatibility of the components is thus increased and consequently for example the clarity, gloss and surface hardness of the cured end product are improved. This is particularly important in the production of coatings.

In the case of a dispersed binder having reactive carbamoyl-N-methylol ether groups the procedure may be for example that a high molecular wieght polyacrylic acid in the form of an amine salt is used as thickener (C) and a low molecular weight copolymer having a K value of about 18 to 22 is used as dispersing agent (D). This copolymer contains ammonium carboxylate groups for example to impart water solubility. These ammonium carboxylate groups also increase compatibility with the thickener and the suspended binder which contains for example carbamoyl-N-methylol ether groups.

Production of the dispersions or suspensions of the invention may be carried out by various methods, for example by introducing the powder into an aqueous solution of thickener and/or dispersing agent or by atomization of an organic binder solution, coating agent solution or the like into an aqueous precipitant which contains the stabilizing components (C) and (D) and simultaneously or subsequently removing the organic solvent.

The dispersion or suspensions may be applied by methods and with equipment conventionally used in the case of liquid solutions of similar types, for example aqueous dispersions or aqueous or organic solutions. These methods include for example brushing, dipping, spraying, flooding, pouring, electrocoating, knife coating or kneading.

The invention is illustrated by the following Examples. Parts and percentages are weight.

EXAMPLE 1

Production of a dispersion or suspension for baking finishes and impregnations

Component (B) is a powder coating composition having a binder from acrylate resin and epoxy resin, pigmented with rutile type $TiO_2$.

Composition: 63 parts of a copolymer from
    40% of styrene
    26% of 2-ethylhexyl acrylate
    13% of methyl methacrylate and -Continued

| |
|---|
| 21% of N-butoxymethyl methacrylamide |
| K value: 22 |
| 7 parts of epoxide resin based on epichlorohydrin and diphenylolpropane; epoxide number: 0.22 (for example EPIKOTE 1001 of Shell) |
| 30 parts of TiO$_2$. |

The constituents of component (B) are homogenized in a Buss kneader at 110°C and then ground and screened. The screen fraction having particle sizes below 90 microns is used. Component (C) is a 0.015% aqueous solution of a high molecular weight polyacrylic acid neutralized with ammonia. The viscosity of this solution is 5 centipoises.

Component (D) is a 60% solution of a copolymer having a K value of 20 from 37.5% of n-butyl acrylate,
37.5% of tert.-butyl acrylate,
15.0% of N-butoxymethylacrylamide,
7.0% of dimethylethanolamonium acrylate and
3.0% of butanediol monoacrylate in isobutanol.

Production of the dispersion suspension 2.5 parts of component (D) is diluted with 12.5 parts of water. Then 50 parts of component (C) is stirred in. Finally 50 parts of component (B) is incorporated by means of a high speed stirrer. A low viscosity stable suspension is formed.

Suspensions which contain an equivalent amount of water instead of component (C) are unstable. A solid sediment forms after a short period of storage.

If only component (D) is replaced by water a coarse-particled suspension is obtained which has average stability in storage but cannot be applied for example with a conventional spraygun.

Production of a baked coating with the suspension of Example 1

The suspension is sprayed with a conventional compressed air spraygun for liquid coating compositions ("Pilot") having a 1 mm nozzle onto deep drawing aluminum, tin plate and polished iron sheet. The spraying pressure is 2 atmospheres gauge in one set of experiments and 6 atmospheres gauge in another set. In the experiments on iron 0.2% of triethanolamine (based on component (B)) is added to the suspension to prevent corrosion.

After the coating has been applied it is predried for a short time and then baked for thirty minutes in a through-circulation dryer at 180°C. Hard, high gloss, scratchproof coatings are obtained. The same result is obtained when the coating is applied by knife coating or dipping. The coatings do not differ from coatings prepared with component (B) by electrostatic powder coating.

EXAMPLE 2

Production of a baking suspension for epoxy-base coatings

Component (B) is a powder having a particle size of less than 100 microns having the composition:
100 parts of epoxy resin based on epichlorohydrin and diphenylolpropane; epoxide value: 0.22 (for example EPIKOTE 1004 of Shell);
50 parts of rutile type TiO$_2$;
2.5 parts of a hardener based on modified dicyanodiamide (for example EPIKURE 107 of Shell); and
2.7 parts of a hardener based on modified dicyanodiamide (for example EPIKURE 108 of Shell).
Component (C) the same as in Example 1.
Component (D) the same as in Example 1.

1.67 parts of component (D) is diluted with 8.33 parts of water. Then 50 parts of component (C) specified in Example 1 is stirred in. 60 parts of component (B) is homogeneously suspended in this solution by means of an impeller.

The suspension is obtained is stable in storage and may be used by conventional methods of applying coating materials.

Production of a coating with the suspension of Example 2

Sheet aluminum and tin plate are coated by means of a spraygun (as in Example 1), a brush and a doctor knife. After preliminary drying all the powder adheres firmly to the substrate. Baking is carried out at 160°C for 30 minutes. High gloss smooth coatings are obtained which are scratch-resistant and flex-resistant.

EXAMPLE 3

A suspension is prepared analogously to Example 2, a 1% aqueous solution of a high molecular weight cellulose derivative (Methocel 90 HG) being used as component (C) (viscosity 10 centipoises).

Production of the suspension 1.67 parts of component (D) is diluted with 8.33 parts of water and 50 parts of the 1% solution of Methocel 90 HG and the product is incorporated into 60 parts of component (B).

The suspension obtained and the coatings obtained therewith have the same properties as in Example 2.

EXAMPLE 4 a. In this experiment the acrylate suspension of Example 1 is mixed 1:1 with the epoxy resin powder suspension of Example 2. The suspension obtained in this way is similarly stable in storage and applicable conventionally. The coatings on deep drawing sheet metal show a very good flow after baking for 30 minutes at 180°C in a drying cabinet.

b. The acrylate powder and epoxy powder used under (a) are mixed dry in a ratio 1:1 in a tumbler mixer. This powder mixture is sprayed electrostatically onto deep drawing sheet metal and baked for 30 minutes at 180°C. The coatings obtained have an unsatisfactory flow with numerous craters. This agrees with the general experience that in electrostatic powder coating powder mixtures result in unsatisfactory flow so that before changing the product the entire coating plant has to be cleaned very carefully.

EXAMPLE 5 a. 2.5 parts of the component (D) specified in Example 1 is diluted with 12.5 g of water. Then 50 parts of component (C) is added but in a concentration of 0.03% (viscosity 11 centipoises). 50 g of the pigment finish Euvinyl Yellow 178 (manufactured by BSAF) is stirred into the mixture of components (D) and (C) by means of an impeller.

b. 8 g of this mixture (a) is carefully stirred with 50 g of the suspension of Example 2. A stable yellow powder suspension in water is obtained. As described in the previous Examples application is made with a spraygun onto sheet metal, dried and baked at 180°C for thirty minutes. The coatings obtained are colored uniformly yellow and have a good flow.

EXAMPLE 6 a. The acrylate copolymer contained in component (B) in Example 1 is prepared by solution polymerization in ethyl acetate. EPIKOTE 1001 and $TiO_2$ are then stirred into this solution in the same ratio to the copolymer as in Example 1, i.e. 7:30:63.

b. 2.5 parts of component (D) is stirred with 50 parts of component (C) and diluted with 12.5 parts of water (Example 1).

c. The mixture (b) is heated at 85°C with vigorous stirring. Into this hot solution containing thickener and suspension agent the mixture (a) is sprayed through a fine nozzle under pressure at the rate at which the ethyl acetate distils off. As soon as spraying in has been completed, stirring is continued under slightly reduced pressure for another ten minutes and the product cooled. A stable powder suspension in water is obtained which agrees with the suspension according to Example 1 in its properties and also in the coating results which can be achieved with it.

EXAMPLE 7

Production of a suspension adhesive based on epoxide:

Component (B) is a powder having a particle size of less than 100 microns and comprising
  100 parts of an epoxy resin based on epichlorohydrin and diphenylolpropane epoxide value: 0.11 (for example EPIKOTE 1004 of Shell)
  2.5 parts of a hardener based on a modified dicyanodiamide (for example EPIKURE of 107 of Shell); and
  2.7 parts of a hardener based on a modified dicyanodiamide (for example EPIKURE 108 of Shell).
Component (C) is the same as in Example 1.
Component (D) is the same as in Example 1.

2.5 parts of component (D) is diluted with 7.5 parts of water and then mixed with 50 parts of component (C) specified in Example 1. 65 parts of component (B) is carefully stirred in by means of an impeller. A smoothly flowing suspension is obtained.

This suspension is applied by means of a brush to deep drawing sheet aluminum and given a preliminary drying. The suspension adheres very well in the predried condition. A second sheet of aluminum is laid on the first. The two sheets, between which the predried suspension is now situated are lightly pressed together with two clamps and heated in a drying cabinet for 20 minutes at 160°C. After cooling the two sheets are firmly bonded together. Separation is only possible by destroying the sheets.

EXAMPLE 8

80 parts of a polyester from isopthalic acid, adipic acid, neopentyl glycol and trimellitic anhydride having an acid number of 55 and a K value of 18 (measured in 3% solution in acetone) is mixed with 20 parts of EPIKOTE 828 (epoxide resin of Shell) and 30 parts of titanium dioxide. Mixing takes place in a Buss kneader at a casing temperature of the kneader of 95°C. The melt obtained solidifies very rapidly after discharge from the kneader and is then coarsely broken up with a hammer mill and then finely ground with an air jet mill. The fraction of particles having diameters of from 0.1 to 1.5 microns is collected.

50 parts of this powder is stirred into 50 parts of a 0.03% aqueous solution of the high molecular weight polyacrylic acid specified in Example 1. The pH of the solution is 0.3. Finally 3 parts of butyl diglycol and 5 parts of a 25% solution of the dimethylethanolamine salt of a copolymer from 54 parts of ethylhexyl acrylate, 15 parts of styrene, 25 parts of the butyl ether of N-methylolacrylamide and 6 parts of acrylic acid are stirred in by means of an impeller. The suspension thus obtained is stable in storage and transportation and may be readily applied with a compressed air spraygun, for example sprayed onto metals. Coatings on deep drawing sheet metal, after baking for fifteen minutes at 200°C in a dryer, exhibit a pendulum hardness (according to DIN 53,157) of 183 seconds and a penetration of 9.1 mm according to DIN 53,156.

EXAMPLE 9

A glass fiber mat is impregnated with the powder suspension obtained according to Example 8 and freed from adherent liquid in a circulating air drying channel. A glass fiber prepreg is thus formed which by compression at 200° to 220°C for 10 or 5 minutes gives dimensionally stable, scratchproof, solvent-resistant moldings.

We claim:

1. A metal coating composition consisting essentially of
A. from 40 to 70 percent by weight based on the weight of the composition of water;
B. from 30 to 60 percent by weight based on the weight of the composition of at least one heat-curable binder which is insoluble or at the most slightly swellable in water, and which is dispersed in component A in the form of particles having a size of from 0.1 to 150 microns; this binder being a synthetic resin selected from the group consisting of
  a. polymerized ethylenically unsaturated monomers,
  b. 1, 2 epoxy resins obtained by reaction of polyhydroxy compounds with epichlorohydrin,
  c. saturated and unsaturated polyesters from a polycarboxylic acid and a polyhydric alcohol,
  d. amino resins, said amino resins being crosslinkable urea-, melamine- or benzoquanamine-formaldehyde precondensates, and
  e. polyurethane forming mixtures of blocked polyisocyanates and saturated polyesters with OH numbers of from 20 to 250: and
c. from 0.1 to 5% by weight based on the weight of the composition of at least one thickener dissolved in water, which has a viscosity of from 0.5 to 50 centipoises in a 0.015% aqueous solution at 20°C: said thickener being an organic polymeric material selected from the group consisting of
  a. salts of polyacrylic acid,
  b. carboxymethylcelluloses,
  c. methylcelluloses,
  d. polyvinylpyrrolidone,
  e. polyacrylamide,
  f. polymethacrylamide,
  g. polymers of ammonium acrylate, ammonium methacrylate or dimethylammonium hydrochloride.

2. The composition of claim 1, wherein the particles of component (B) contain at least one other additive from the group consisting of pigments, fillers, crosslinking catalysts, accelerators, and plasticizers.

3. The composition of claim 1, wherein the particles of component (B) have a particle diameter of from 5 to 90 microns.

4. The composition of claim 1 wherein the heat-curable binder (B) has at 125°C a melt viscosity of from 500 to 10,000 poises and component (C) is the salt of a polyacrylic acid.

5. The composition of claim 1 wherein the heat-curable polymeric binder (B) has a melting point range of from 60° to 150°C and a melt viscosity at 125°C of from 500 to 10,000 poises and at 125°C does not exceed 10,000 poises until after three minutes.

6. The composition of claim 1 wherein the heat-curable polymeric binder (B) contains at least one functional grouping from the group consisting of hydroxyl, carboxyl, epoxide, amide, amino, isocyanato, active methlene, anhydride, methylol, methylol ether and an ethylenically unsaturated grouping.

7. The composition of claim 1 wherein component (B) is an epoxy resin having an epoxide value of from 0.02 to 0.4.

8. The composition of claim 1 wherein component (B) is a mixture of from 60 to 95 parts of a polyester based on isophthalic acid, adipic acid, neopentyl glycol and trimellitic anhydride which has an acid number of from 40 to 60 and 5 to 40 parts of at least one epoxy resin based on 2,2'-bis (4-hydroxyphenyl)-propane.

9. The composition of claim 1 wherein component (B) is a mixture of at least one saturated polyester having a hydroxyl number of from 20 to 250 with a diisocyanate or triisocyanate which is blocked by caprolactam.

10. The composition of claim 1 wherein component (A) contains up to 5% by weight of a inert water-miscible volatile organic solvent.

11. The composition of claim 2 wherein the particles of component (B) have a diameter of from 5 to 90 microns.

12. The composition of claim 2 wherein the heat-curable binder (B) has at 125°C a melt viscosity of from 500 to 10,000 poises and component (C) is a salt of a polyacrylic acid.

13. The composition of claim 2 wherein component (B) consists essentially of an epoxy resin, at least one epoxy resin hardener and at least one pigment.

14. The composition of claim 2 wherein component (B) consists essentially of a polyester, an epoxy resin and a pigment.

* * * * *